United States Patent [19]
Stevens, II

[11] Patent Number: 5,975,124
[45] Date of Patent: *Nov. 2, 1999

[54] WATER TEMPERATURE AND LEVEL REGULATOR

[76] Inventor: Clifford G. Stevens, II, Ashford Terrace, 650 Wynn Dr. Apt 256, Huntsville, Ala. 35816

[ * ] Notice: This patent issued on a continued prosecution application filed under 37 CFR 1.53(d), and is subject to the twenty year patent term provisions of 35 U.S.C. 154(a)(2).

[21] Appl. No.: 09/070,658

[22] Filed: Apr. 30, 1998

[51] Int. Cl.$^6$ ............................. F16K 31/02; F16K 31/64
[52] U.S. Cl. ............................. 137/392; 4/668; 68/12.05; 68/12.22; 68/207; 134/113; 137/606; 137/624.12; 137/624.15; 236/12.12; 251/129.04
[58] Field of Search ...................... 137/386, 392, 137/558, 606, 624.11, 624.12, 624.13, 624.5; 236/12.12, 12.15; 68/207, 12.05, 12.22; 134/113; 4/668; 251/129.04

[56] References Cited

U.S. PATENT DOCUMENTS

| | | | |
|---|---|---|---|
| 3,882,967 | 5/1975 | Gulla et al. | 137/392 |
| 4,528,709 | 7/1985 | Getz et al. | 68/207 |
| 4,563,780 | 1/1986 | Pollack | 137/392 |
| 4,641,671 | 2/1987 | Nogi et al. | 134/113 |
| 4,835,991 | 6/1989 | Knoop et al. | 68/207 |
| 5,215,251 | 6/1993 | Volk et al. | 236/12.15 |
| 5,255,844 | 10/1993 | Miller et al. | 236/12.15 |
| 5,439,019 | 8/1995 | Quandt et al. | 236/12.12 |

FOREIGN PATENT DOCUMENTS 2251709  7/1992  United Kingdom ................ 236/12.05

*Primary Examiner*—George L. Walton

[57] ABSTRACT

A water outlet control system is provided including a water basin having a drainage port formed on a lower extent thereof and an open top with an upper peripheral edge. A water source includes a hot water inlet and a cold water inlet each connected to a water outlet situated over the water basin for dispensing water therein. Next included is a pair of water control valves having a hot water control valve mounted between the hot water inlet and the water outlet and a cold water control valve mounted between the cold water inlet and the water outlet. The control valves each allow the adjustment of a flow of water therethrough, thereby permitting the control of a resultant water flow from the water outlet. A level indicator is mounted on an interior surface of the water basin to indicate a present level of water within the water basin between the drainage port and the upper peripheral edge thereof. Finally, a control panel includes buttons for adjusting the present level of the water within the water basin.

2 Claims, 2 Drawing Sheets

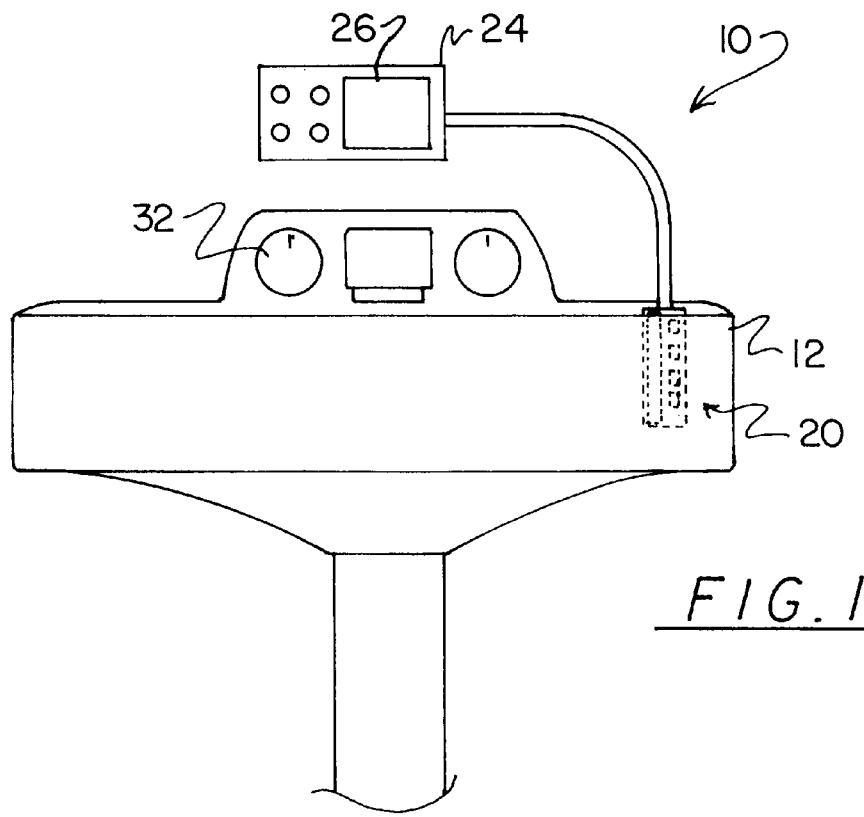
FIG. 1
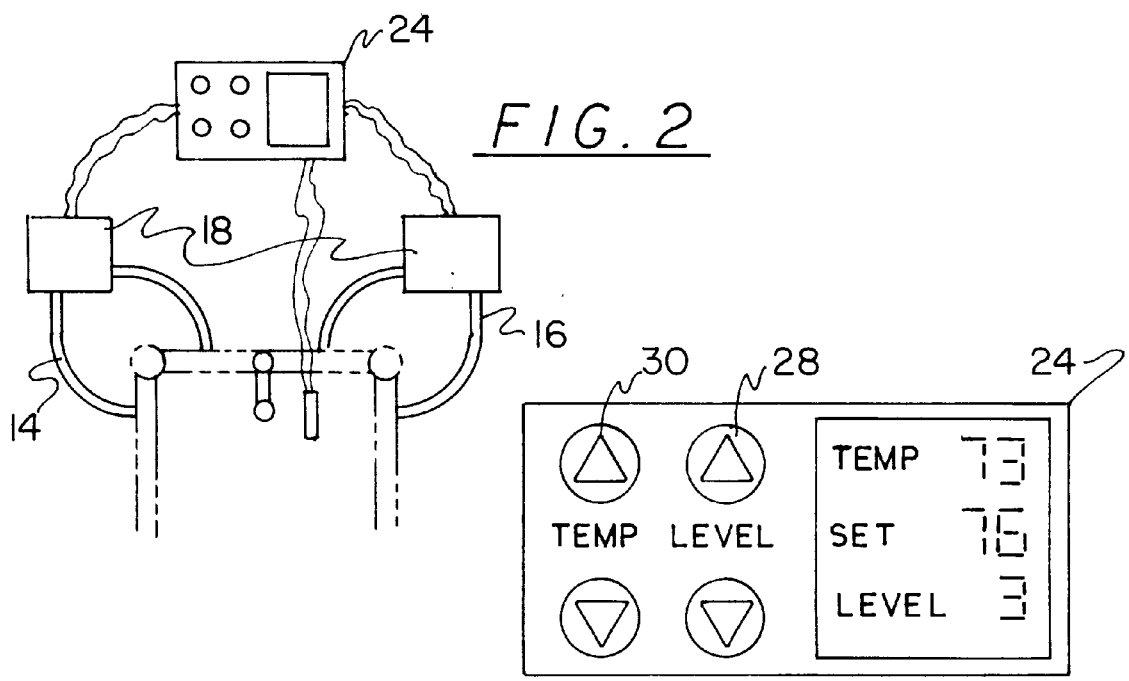
FIG. 2
FIG. 3

WATER TEMPERATURE AND LEVEL REGULATOR

BACKGROUND OF THE INVENTION

1. Field of the Invention

The present invention relates to water control devices and more particularly pertains to a new water temperature and level regulator for controlling a level, temperature and other parameters of water within a basin.

2. Description of the Prior Art

The use of water control devices is known in the prior art. More specifically, water control devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art water control devices include U.S. Pat. No. 4,823,414; U.S. Pat. No. 4,681,141; U.S. Pat. No. 4,563,780; U.S. Pat. No. 5,025,516; U.S. Pat. No. 4,870,986; and U.S. Pat. No. Des. 332,485.

In these respects, the water temperature and level regulator according to the present invention substantially departs from the conventional concepts and designs of the prior art, and in so doing provides an apparatus primarily developed for the purpose of controlling a level, temperature and other parameters of water within a basin.

SUMMARY OF THE INVENTION

In view of the foregoing disadvantages inherent in the known types of water control devices now present in the prior art, the present invention provides a new water temperature and level regulator construction wherein the same can be utilized for controlling a level, temperature and other parameters of water within a basin.

The general purpose of the present invention, which will be described subsequently in greater detail, is to provide a new water temperature and level regulator apparatus and method which has many of the advantages of the water control devices mentioned heretofore and many novel features that result in a new water temperature and level regulator which is not anticipated, rendered obvious, suggested, or even implied by any of the prior art water control devices, either alone or in any combination thereof.

To attain this, the present invention generally comprises a water basin having a drainage port formed on a lower extent thereof. The water basin is further equipped with an open top and an upper peripheral edge. FIGS. 2 & 4 show a water source including a hot water inlet and a cold water inlet each connected to a water outlet situated over the water basin for dispensing water therein. A pair of water control valves are provided including a hot water control valve mounted between the hot water inlet and the water outlet. Associated therewith is a cold water control valve mounted between the cold water inlet and the water outlet. In use, the water valves each allow the adjustment of a flow of water therethrough, thereby permitting the control of a pressure and temperature of a resultant water flow from the water outlet. FIGS. 1 & 4 depict a level indicator mounted on an interior surface of the water basin and situated in a generally vertical orientation. The level indicator serves to indicate a present level of a plurality of discrete predetermined levels of water within the water basin. Such predetermined levels span between the drainage port and the upper peripheral edge of the water basin. Also situated within the water basin is a temperature sensor for indicating a present temperature of water within the water basin. Finally, a rectangular control panel is mounted above the water basin and connected between the water control valves, temperature sensor and the level indicator. As shown in FIG. 3, the control panel is equipped with a display for continuously depicting the present level, present temperature, and desired temperature of the water within the water basin. The control panel further includes a pair of level buttons for adjusting the present level of the water within the water basin. A pair of temperature buttons are provided for adjusting the desired temperature of the water within the basin.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new water temperature and level regulator apparatus and method which has many of the advantages of the water control devices mentioned heretofore and many novel features that result in a new water temperature and level regulator which is not anticipated, rendered obvious, suggested, or even implied by any of the prior art water control devices, either alone or in any combination thereof.

It is another object of the present invention to provide a new water temperature and level regulator which may be easily and efficiently manufactured and marketed.

It is a further object of the present invention to provide a new water temperature and level regulator which is of a durable and reliable construction.

An even further object of the present invention is to provide a new water temperature and level regulator which is susceptible of a low cost of manufacture with regard to both materials and labor, and which accordingly is then susceptible of low prices of sale to the consuming public, thereby making such water temperature and level regulator economically available to the buying public.

Still yet another object of the present invention is to provide a new water temperature and level regulator which provides in the apparatuses and methods of the prior art sonic of the advantages thereof, while simultaneously overcoming some of the disadvantages normally associated therewith.

Still another object of the present invention is to provide a new water temperature and level regulator for controlling a level, temperature and other parameters of water within a basin.

Even still another object of the present invention is to provide a new water temperature and level regulator that includes a water basin having a drainage port formed on a lower extent thereof and an open top with an upper peripheral edge. A water source includes a hot water inlet and a cold water inlet each connected to a water outlet situated over the water basin for dispensing water therein. Next included is a pair of water control valves having a hot water control valve mounted between the hot water inlet and the water outlet and a cold water control valve mounted between the cold water inlet and the water outlet. The control valves each allow the adjustment of a flow of water therethrough, thereby permitting the control of a resultant water flow from the water outlet. A level indicator is mounted on an interior surface of the water basin to indicate a present level of water within the water basin between the drainage port and the upper peripheral edge thereof. Finally, a control panel includes buttons for adjusting the present level of the water within the water basin.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front view of a new water temperature and level regulator according to the present invention.

FIG. 2 is a fluidic schematic of the present invention.

FIG. 3 is a front view of the control panel of the present invention.

DESCRIPTION OF THE PREFERRED EMBODIMENT

Figure 4:
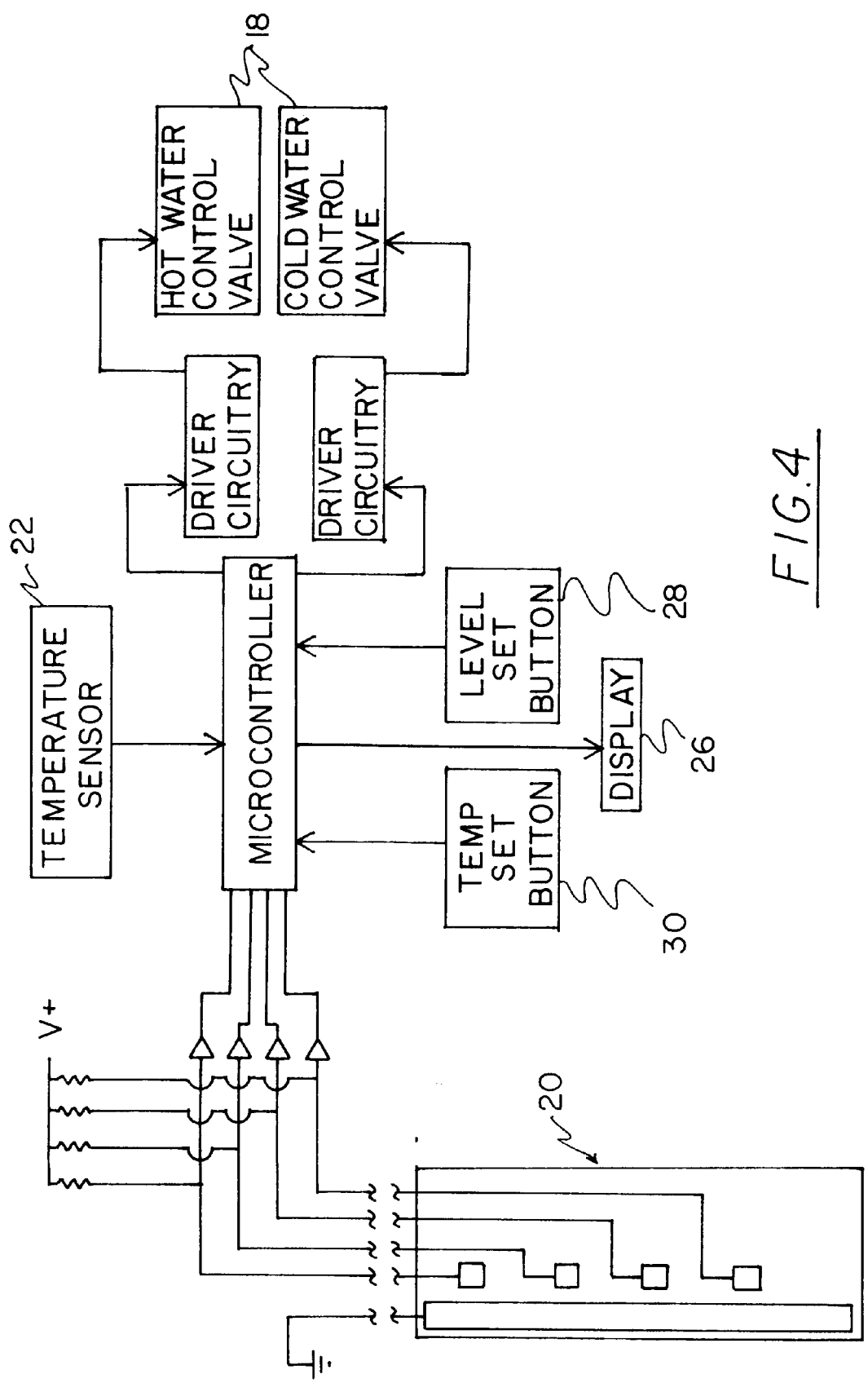
FIG. 4 is a schematic diagram of the present invention.

With reference now to the drawings, and in particular to FIGS. 1 through 4 thereof, a new water temperature and level regulator embodying the principles and concepts of the present invention and generally designated by the reference numeral 10 will be described.

The present invention, designated as numeral 10, includes a water basin 12 having a drainage port formed on a lower extent thereof. The water basin is further equipped with an open top and an upper peripheral edge. FIGS. 2 & 4 show a water source including a hot water inlet 14 and a cold water inlet 16 each connected to a water outlet situated over the water basin for dispensing water therein. While the water basin is shown to be sink in FIG. 1, it should be noted that a bath tub or shower may also be employed in alternate embodiments.

A pair of water control valves 18 are provided including a hot water control valve mounted between the hot water inlet and the water outlet. Associated therewith is a cold water control valve mounted between the cold water inlet and the water outlet. In use, the water valves each allow the adjustment of a flow of water therethrough, thereby permitting the control of a pressure and temperature of a resultant water flow from the water outlet. This may be accomplished by controlling not only the flow of water from each valve but also a proportion of water therefrom.

FIGS. 1 & 4 depict a level indicator 20 mounted on an interior surface of the water basin and situated in a generally vertical orientation. The level indicator serves to indicate a present level of a plurality of discrete predetermined levels of water within the water basin. Such predetermined levels span between the drainage port and the upper peripheral edge of the water basin. To accomplish this, a flexible planar strip is mounted on the basin which includes an elongated vertical contact with a plurality of vertically spaced square contacts mounted adjacent thereto. Note FIG. 4. By this structure, water acts to provide connectivity between the elongated vertical contact and the square contacts. Also situated within the water basin is a conventional temperature sensor 22 for indicating a present temperature of water within the water basin. Such temperature sensor may be mounted on the aforementioned strip.

Finally, a rectangular control panel 24 is mounted above the water basin and connected between the water control valves, temperature sensor and the level indicator. Such connection is preferably afforded behind a wall adjacent to the basin. As shown in FIG. 3, the control panel is equipped with a display 26 for continuously depicting the present level, present temperature, and desired temperature of the water within the water basin.

The control panel further includes a pair of level buttons 28 for adjusting the present level of the water within the water basin. By adjusting the present level, the water control valves are governed such that the flow of water is ceased upon the receipt of a signal from the appropriate square contact. A pair of temperature buttons 30 are provided for adjusting the desired temperature of the water within the basin. It should be noted that the water control valves are governed to add hot and cold water, in accordance with the water level restrictions, until the present temperature of water within the basin is equal to the desired temperature. In the case of both the level and temperature buttons, both an increment button and a decrement button are included for adjustment purposes.

As an option, a key pad may be situated on the control panel for various purposes. For example, it may be used in conjunction with a timer mechanism which allows the flow of water at a present time for a selected duration. The key pad may also be utilized for entering a numeric code which would allow the flow of water by only authorized persons. Manual override control dials 32 may be provided for manually controlling the water valves. Further, as a safety feature, the control panel may be adapted to preclude the flow of water when a signal is received by the uppermost contact of the level indicator. Finally, the control panel may be equipped with a serial or parallel port for communicating with a computer to expand the number of features.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A water outlet control system comprising:

a water basin including a drainage port formed on a lower extent thereof and an open top with an upper peripheral edge, wherein the water basin is selected from a group comprised of a sink, bathtub, and a shower;

a water source including a hot water inlet and a cold water inlet each connected to a water outlet situated over the water basin for dispensing water therein;

a pair of water control valves including a hot water control valve mounted between the hot water inlet and the water outlet, and a cold water control valve mounted between the cold water inlet and the water outlet, the water valves each being adapted to allow the adjustment of a flow of water therethrough thereby permitting the control of a pressure and a temperature of a resultant water flow from the water outlet;

a water level sensor mounted on an interior surface of the water basin and situated in a generally vertical orientation, the level sensor being adapted to sense a present level of a plurality of discrete predetermined levels of water in the water basin between the drainage port and the upper peripheral edge thereof;

a temperature sensor for indicating a present temperature of water in the water basin; and a control panel operatively connected to the water control valves, the temperature sensor and the level sensor, the control panel having a display for continuously depicting the present level as sensed by the level sensor, the present temperature as sensed by the temperature sensor, and a desired temperature of the water in the water basin as selected by a user, the control panel further including a pair of water level selection buttons for adjusting the desired level of the water in the water basin and a pair of temperature selection buttons for adjusting the desired temperature of the water in the basin;

wherein the control panel further includes a keypad adapted to allow the flow of water only upon the entry of a correct numeric code on the keypad;

wherein the control panel further includes a timer mechanism adapted to allow the flow of water at a preset time and for a selected time duration;

wherein the water level selection buttons and the temperature selection buttons each include an increment button and a decrement button;

wherein the water level sensor includes a flexible planar strip mounted on an interior surface of the basin, an elongated vertical negative contact mounted on the strip for contacting the water at any of the predetermined levels, a plurality of discrete vertically spaced positive contacts mounted in the strip adjacent to the vertical contact such that water contacting the negative contact and at least one of the positive contacts completes a electrical circuit of the water level sensor;

wherein the control panel is adapted to preclude the flow of water when water is sensed by an uppermost one of the vertically spaced positive contacts;

manual override dials for manually controlling the water flow through the water control valves; and wherein the control panel includes a computer port for permitting connection of the control panel with an external computer for communicating with the external computer.

2. A water control system as set forth in claim 1 wherein the water basin comprises a sink.

* * * * *